(12) United States Patent
Levy (10) Patent No.: US 7,650,640 B1
(45) Date of Patent: Jan. 19, 2010

(54) METHOD AND SYSTEM FOR DETECTING IA32 TARGETED BUFFER OVERFLOW ATTACKS

(75) Inventor: Elias Levy, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 819 days.

(21) Appl. No.: 10/968,225

(22) Filed: Oct. 18, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/24; 726/23
(58) Field of Classification Search .................... 726/24, 726/23
See application file for complete search history.

(56) References Cited

U.S. PATENT DOCUMENTS

| | | | | |
|---|---|---|---|---|
| 5,748,964 | A * | 5/1998 | Gosling | 717/126 |
| 6,301,699 | B1 * | 10/2001 | Hollander et al. | 717/131 |
| 6,513,122 | B1 * | 1/2003 | Magdych et al. | 726/23 |
| 7,093,239 | B1 * | 8/2006 | van der Made | 717/135 |
| 7,225,468 | B2 * | 5/2007 | Waisman et al. | 726/23 |
| 7,228,563 | B2 * | 6/2007 | Szor | 726/22 |
| 7,260,843 | B2 * | 8/2007 | Hentunen | 726/22 |
| 7,290,266 | B2 * | 10/2007 | Gladstone et al. | 719/318 |
| 2003/0014667 | A1 * | 1/2003 | Kolichtchak | 713/201 |
| 2003/0135844 | A1 * | 7/2003 | Yellin et al. | 717/126 |
| 2004/0133777 | A1 * | 7/2004 | Kiriansky et al. | 713/166 |
| 2004/0255163 | A1 * | 12/2004 | Swimmer et al. | 713/201 |
| 2005/0251570 | A1 * | 11/2005 | Heasman et al. | 709/224 |
| 2007/0089171 | A1 * | 4/2007 | Aharon et al. | 726/22 |

OTHER PUBLICATIONS

Roger Jegerlehner; Intel Assembler 80186 and higher Code Table; V 2.3; 1996-2003.*
Aleph One, "*Smashing the Stack for Fun and Profit*", Phrack 49, vol. Seven, Issue Forty-Nine, pp. 1-28 [online] Retrieved from the Internet:<URL:http://www.phrack.org/show.php?p=49&a=14>.
Gula, R., "*Re: IDS: Detecting exploits/shellcode*", online email thread, Jun. 15, 2000, pp. 1-3 [online]. Retrieved from the Internet:<URL:http://www.shmoo.com/mail/ids/jun00/msg00026.shtml>.
Jeru, "*Advanced Evasion of Buffer Overflow Detection*", pp. 1-36 [online]. Retrieved from the Internet:<URL:http://www.cis.udel.edu/~zhi/www.docshow.net/ids/idsevade.zip>.
No author given, ADMmutate 0.8.4 by K2, pp. 1-6 [online]. Retrieved from the Internet:<URL:http://www.ktwo.ca/readme.html>.
No author given, "*Polymorphic Shellcode Engine Using Spectrum Analysis*", pp. 1-73 [online]. Retrieved from the Internet:<URL:http://www.phrack.org/phrack/61/p61-0x09_Polymorphic_Shellcode_Engine.txt>.

(Continued)

*Primary Examiner*—Michael J Simitoski
*Assistant Examiner*—James Turchen
(74) *Attorney, Agent, or Firm*—Gunnison, McKay & Hodgson, L.L.P.; Serge J. Hodgson (57) ABSTRACT

Data streams are scanned to detect malicious jump-call-pop shellcode constructs used in attacks against stack-based buffer overflow vulnerabilities on software executing in the IA32 architecture prior to execution. Upon a detection of a malicious jump-call-pop shellcode construct, protective action is taken, such as preventing the malicious shellcode from executing.

20 Claims, 5 Drawing Sheets

OTHER PUBLICATIONS

No author given, *"Polymorphic Shellcodes vs. Application IDSs"*, Next Generation Security Technologies, Jan. 21, 2002, pp. 1-9 [online]. Retrieved from the Internet:<URL:http://www.cgisecurity.com/lib/polymorphic_shellcodes_vs_app_IDSs.PDF>.

Szor, P., *"Attacks on WIN32"*, Virus Bulletin Conference, Oct. 1998, Virus Bulletin Ltd., The Pentagon, Abingdon, Oxfordshire, England, pp. 57-84 [online]. Retrieved from the Internet:<URL:http://www.peterszor.com/attacks.pdf>.

Toth, T. and Kruegel, C., *"Accurate Buffer Overflow Detection Via Abstract Payload Execution"*, Apr. 30, 2002, Distributed Systems Group, Technical University of Vienna, pp. 1-18 [online]. Retrieved from the Internet:<URL:http://www.infosys.tuwien.ac.at/Staff/tt/publicationsAccurate_Buffer_Oveflow_Detection_via_Abstract_Payload_Execution.pdf>.

Ulfabodo, *"IDS: Polymorphic Shellcode Detection"*, online email thread, May 6, 2003, pp. 1-2 [online]. Retrieved from the Internet:<URL:http://seclists.org/lists/focus-ids/2003/May/0014.html>.

\* cited by examiner

METHOD AND SYSTEM FOR DETECTING IA32 TARGETED BUFFER OVERFLOW ATTACKS

BACKGROUND OF THE INVENTION

1. Field of the Invention

The present invention relates to the protection of computer systems. More particularly, the present invention relates to a method and system for detecting malicious shellcode constructs used in stack-based buffer overflow attacks.

2. Description of Related Art

Buffer overflows are one of the most commonly exploited software vulnerabilities in software today as they can potentially allow attackers to execute in the context of the vulnerable process. Generally, buffers are data storage areas in computer memory that hold a predefined amount of finite data. A buffer overflow occurs when a program attempts to store data into a buffer, where the data is larger than the size of the buffer. When the data exceeds the size of the buffer, the extra data can overflow into the adjacent memory locations. In this manner, it is possible to corrupt valid data and possibly to change the execution flow and instructions in the stack.

One type of buffer overflow, commonly termed a stack-based buffer overflow, involves overwriting stack memory. A stack-based buffer overflow typically occurs in programs that do not verify the length of the data being copied into a buffer.

By exploiting a stack-based buffer overflow, it is possible to inject malicious code, sometimes called malicious shellcode, into the execution flow. This malicious shellcode can allow remote system level access, giving unauthorized access to not only an attacker, e.g., a malicious hacker, but also to replicating malicious code. Many damaging computer worms have been known to use stack-based buffer overflows to infect new computer systems.

SUMMARY OF THE INVENTION

In accordance with one embodiment, a method includes receiving data, stalling the data, and determining whether a malicious jump-call-pop shellcode construct is detected in the data. In one embodiment, the malicious jump-call-pop shellcode construct is used in stack-based buffer overflow attacks against software executing in an Intel® IA32 architecture. If a malicious jump-call-pop shellcode construct is detected in the data, protective action is taken, such as preventing execution of the malicious jump-call-pop shellcode construct, otherwise the data are released.

Embodiments in accordance with the invention permit the detection of stack-based buffer overflow attacks under the Intel® IA32 architecture that require the malicious shellcode to determine its (the malicious shellcode's) location in memory by using a jump-call-pop shellcode construct, i.e., a malicious jump-call-pop shellcode construct.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Commonly, shellcode is an assembly language program which executes a shell, such as the /bin/sh Unix shell, that gives a user command line access to a computer system. One way to inject shellcode, such as a malicious shellcode, into a computer memory is by exploiting a stack-based buffer overflow.

A stack-based buffer overflow occurs when a program writes data beyond the allocated end of a buffer space allocated to a function in computer memory. The stack-based buffer overflow allows the program to overwrite a valid return address of the function with a different address and change the flow of execution of the program. When the stack-based buffer overflow is implemented by an attacker, typically a portion of the stack allocated to a function and the valid return address of the function is overwritten with malicious shellcode which redirects process execution to a malicious code function.

It is a common requirement for the malicious shellcode an attacker wants to execute in a vulnerable process to determine its (the malicious shellcode's) address in the computer memory. Under many operating system architectures this is accomplished by reading the program counter, also termed the instruction pointer, associated with the stack.

Under an Intel® IA32 processor architecture, however, an executing program cannot determine its (the executing program's) location in memory by simply reading the program counter, e.g., the instruction pointer. This is not permitted in the Intel® IA32 architecture.

To circumvent this feature of the Intel® IA32 architecture, a common method used by an attacker to enable malicious shellcode to determine its (the malicious shellcode's) address in the memory is by utilizing a jump-call-pop shellcode construct, herein termed a malicious jump-call-pop shellcode construct when associated with an attacker's malicious shellcode. Herein malicious shellcode is defined as any computer program, module, set of modules, or code that enters a computer system without an authorized user's knowledge and/or without an authorized user's consent. Further herein, malicious shellcode activity is defined as any activity that is indicative of malicious shellcode.

Broadly viewed, a malicious jump-call-pop shellcode construct includes: a jump instruction that directs execution to the location of a call instruction; a call instruction that directs execution to a pop instruction; and, a pop instruction that loads a program counter value from the stack into a register accessible by the malicious shellcode.

This malicious jump-call-pop shellcode construct results from features of the Intel® IA32 architecture, herein referred to as simply the IA32 architecture, as now briefly described. In the IA32 architecture, a relative call instruction will push the program counter value to the stack and continue execution at an address, i.e., a location, relative to the program counter value, the offset of which is given by the call instruction's destination parameter, also termed a destination argument. This permits the malicious shellcode to determine its (the malicious shellcode's) location in memory by using a pop instruction to load the program counter value from the stack into a register.

However, under the IA32 architecture, the destination argument to the call instruction is a 32-bit signed integer, which means that any positive offset (to represent the location of the pop instruction) from the call instruction less than $2^{16}$ necessitates the use of a zero byte to represent the positive offset in the malicious shellcode. Utilizing a positive offset less than $2^{16}$ is undesirable as most common buffer overflows are the result of manipulations of strings in programs coded in the C or C++ language, which have a convention where a null byte represents the end of the string. Further, utilizing a positive offset greater than $2^{16}$ is undesirable as the offset location would require the size of the malicious shellcode file to be extremely large and thus difficult to conceal from detection.

Thus, to circumvent the above, some attackers employ malicious shellcode that utilizes a negative offset (which will not require a zero byte) as the destination argument to the call instruction. The use of a negative offset, however, necessitates that some of the malicious shellcode be placed before the call instruction—malicious shellcode that will need to be jumped over to reach the call instruction by utilizing a relative jump instruction. Thus, the execution of the instructions in the malicious shellcode results in a jump forward over a portion of the malicious shellcode to the location of a call instruction in the malicious shellcode, a call back over a portion of the malicious shellcode to a pop instruction in the malicious shellcode, and a pop of the program counter value from the stack to a register, i.e., a resulting malicious jump-call-pop shellcode construct. The IA32 architecture is well known to those of skill in the art and is not further described in detail to avoid detracting from the principles of the invention.

In accordance with the present invention, a malicious jump-call-pop shellcode construct is detected in a data stream prior to execution to allow protective action to be taken, such as to prevent execution of the malicious jump-call-pop shellcode, and any associated malicious shellcode.

Figure 2:
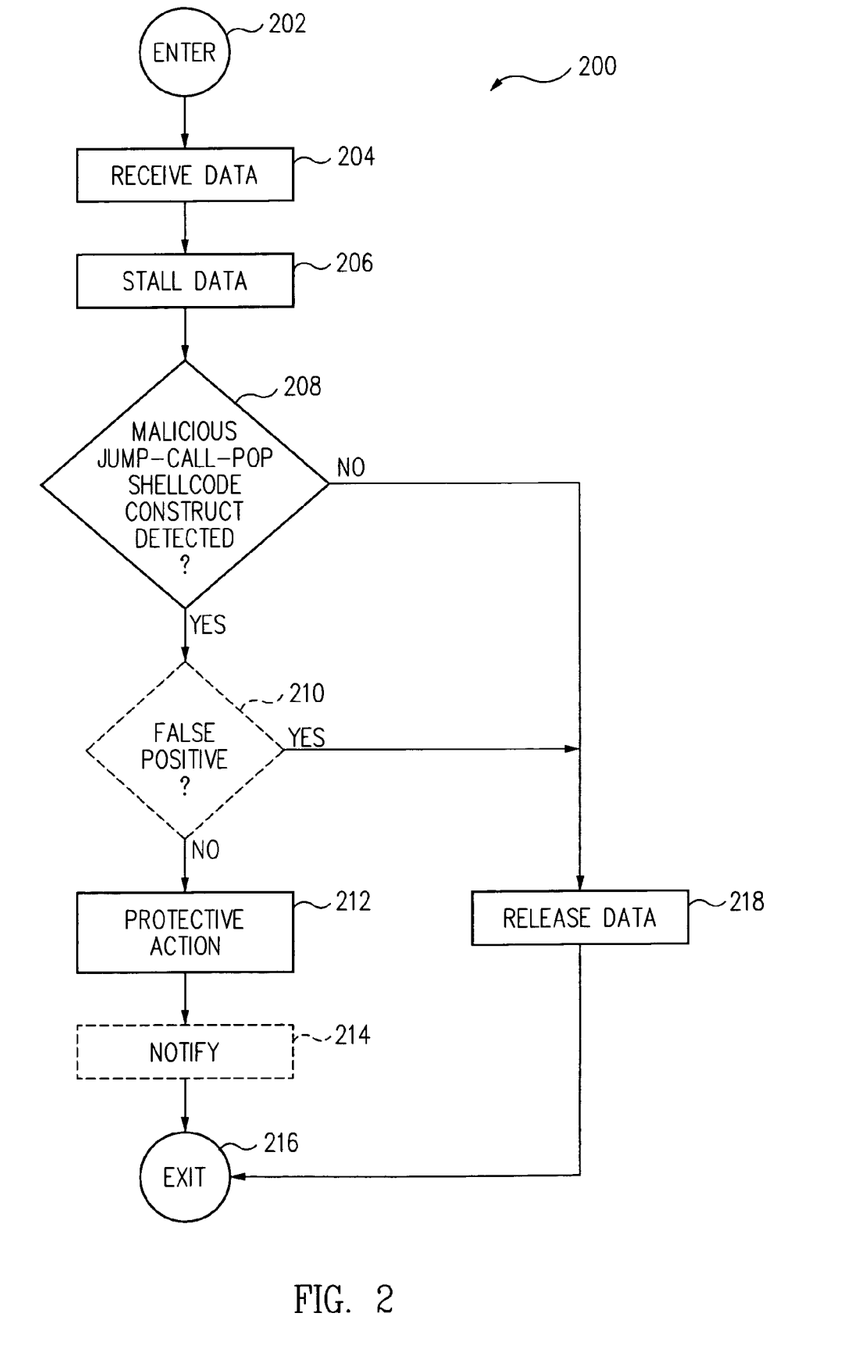
FIG. 2 illustrates a flow diagram of a process for detecting a malicious jump-call-pop shellcode construct in accordance with one embodiment of the invention.

In accordance with one embodiment of the invention, referring generally to FIG. 2, a method 200 includes receiving data, such as data packets in a data stream (operation 204), and stalling the data (operation 206). The data are scanned and a determination is made whether a malicious jump-call-pop shellcode construct is detected (operation 208). If a malicious jump-call-pop shellcode construct is detected ("YES"), protective action is taken (operation 212). Otherwise, if a malicious jump-call-pop shellcode construct is not detected ("NO"), the data are released (operation 218).

Optionally, prior to taking protective action, a false positive check is performed (operation 210). Further, optionally, a notification (operation 214) is provided to a user or other entity advising of a detection and/or protective action taken. The present invention can be implemented as part of a network-based intrusion detection system (IDS), described herein reference to FIG. 1, as well as part of a host-based IDS, described herein with reference to FIG. 5.

Figure 1:
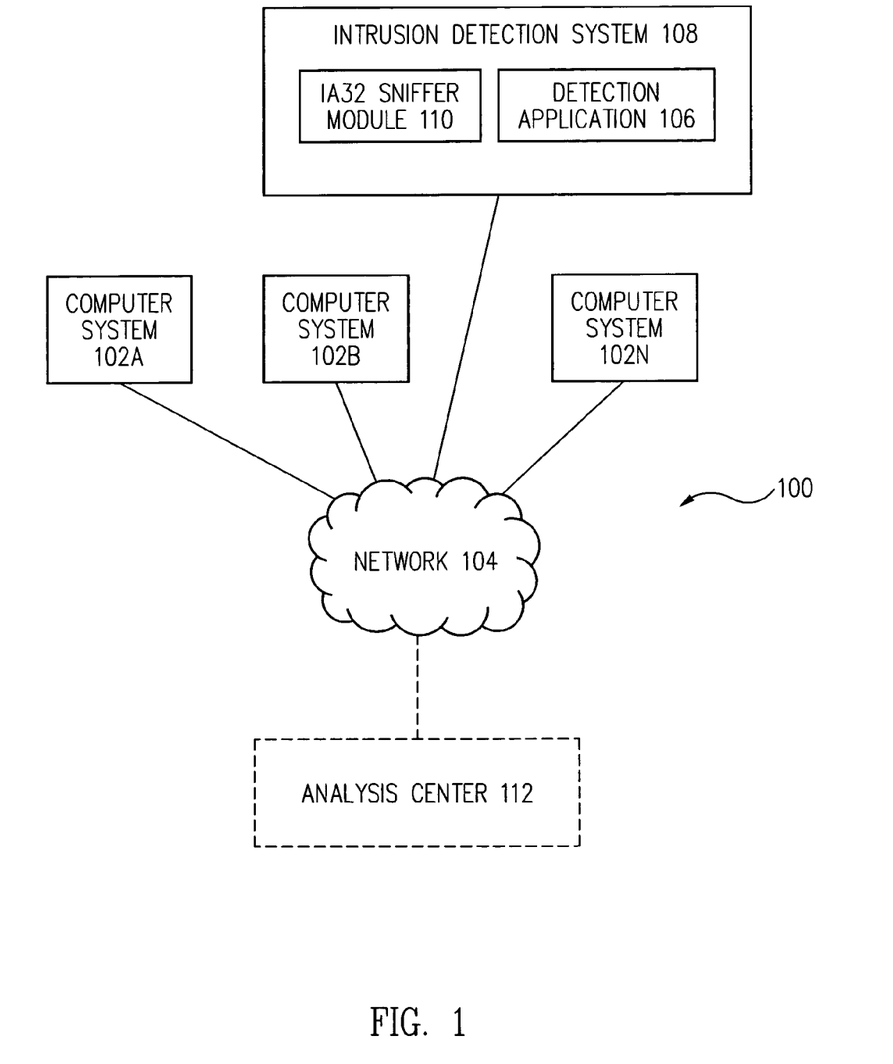
FIG. 1 illustrates a network-based intrusion detection system (IDS) including a detection application for detecting a malicious jump-call-pop shellcode construct in accordance with one embodiment of the invention.

FIG. 1 illustrates a network-based intrusion detection system (IDS) 108 including a detection application 106 for detecting a malicious jump-call-pop shellcode construct in accordance with one embodiment of the invention. In particular, FIG. 1 illustrates a computer system 100 in which one or more computer systems 102A-102n are interconnected by a network 104. Network 104 is any network that is of interest to a user.

In one embodiment, network-based IDS 108 is connected to network 104 and monitors data streams communicated over network 104 to detect attempted attacks or intrusions communicated over network 104. In particular, network-based IDS 108 monitors the data packets in data streams communicated over network 104 to computer systems 102A-102n to detect attempted attacks or intrusions communicated over network 104, such as a malicious jump-call-pop shellcode construct. In one embodiment, detection application 106 is executing as part of network-based IDS 108.

In the present embodiment, network-based IDS 108 includes a module for intercepting and examining data streams communicated over network 104, such as an IA32 sniffer module 110. In the present embodiment, IA32 sniffer module 110 intercepts data packets in a data stream and passes the data packets to detection application 106 for evaluation. In some embodiments, network-based IDS 108 is optionally connected, such as over network 104, to an analysis center 112, to allow information, such as a detection of a malicious jump-call-pop shellcode construct, to be communicated to analysis center 112 for further examination and/or action. The particular type of and configuration of computer systems 102A-102n, network-based IDS 108, analysis center 112, and IA32 sniffer module 110 are not essential to this embodiment of the present invention.

FIG. 2 illustrates a flow diagram of a process 200 for detecting a malicious jump-call-pop shellcode construct in accordance with one embodiment of the invention. Execution of detection application 106 on network-based IDS 108 results in the operations of process 200 as described herein in one embodiment.

Referring now to FIGS. 1 and 2 together, in one embodiment, IA32 sniffer module 110 intercepts data packets in data streams communicated over network 104 and passes the data packets to detection application 106 and process 200 is entered at ENTER operation 202. Thus, in the present embodiment, data are intercepted in transit prior to receipt by a target computer system, e.g., for example, intercepted in transit to target computer system 102A from sending computer system 102B. From ENTER operation 202, processing transitions to a RECEIVE DATA operation 204.

In RECEIVE DATA operation 204, detection application 106 receives the data, e.g., data packets, from IA32 sniffer module 110, and from RECEIVE DATA operation 204, processing transitions to a STALL DATA operation 206.

In STALL DATA operation 206, the data are stalled, such as in a buffer, or other memory structure, to prevent the data from being received by the target computer system while the data are examined for the presence of a malicious jump-call-pop shellcode construct. From STALL DATA operation 206, processing transitions to a MALICIOUS JUMP-CALL-POP SHELLCODE CONSTRUCT DETECTED check operation 208.

In MALICIOUS JUMP-CALL-POP SHELLCODE CONSTRUCT DETECTED check operation 208, the stalled data, e.g., the data packets, are scanned for the presence of a malicious jump-call-pop shellcode construct. Herein a malicious jump-call-pop shellcode construct is any shellcode including a jump instruction a call instruction, and a pop instruction that results in a program counter value being made available for use by malicious shellcode.

In one embodiment, the stalled data are examined to determine whether there is a match to one or more malicious jump-call-pop shellcode signatures. Herein a malicious jump-call-pop shellcode signature is a pattern of a jump instruction, a call instruction, and a pop instruction that identifies shellcode or a portion of shellcode in data as being a malicious jump-call-pop shellcode construct. In one embodiment, the one or more malicious jump-call-pop shellcode signatures are maintained in a malicious shellcode signature database.

In one embodiment, the malicious shellcode signature database is maintained in a memory structure of detection application 106, while in other embodiments the malicious shellcode signature database is maintained elsewhere, such as in network-based IDS 108, and is accessible by detection application 106. Detection of a malicious jump-call-pop shellcode construct is further described herein with reference to FIGS. 3 and 4. Upon a determination that a malicious jump-call-pop shellcode construct is not detected ("NO"), processing transitions from MALICIOUS JUMP-CALL-POP SHELLCODE CONSTRUCT DETECTED check operation 208 to a RELEASE DATA operation 218.

In RELEASE DATA operation 218, the stalled data are released, such as to network-based IDS 108 or a target computer system, and processing transitions from RELEASE DATA operation 218 to an EXIT operation 216 with processing exiting method 200.

Alternatively, referring again to MALICIOUS JUMP-CALL-POP SHELLCODE CONSTRUCT DETECTED check operation 208, upon a determination that a malicious jump-call-pop shellcode construct is detected ("YES"), processing transitions from MALICIOUS JUMP-CALL-POP SHELLCODE CONSTRUCT DETECTED check operation 208, to an optional FALSE POSITIVE check operation 210. Otherwise, if optional FALSE POSITIVE check operation 210 is not performed, processing transitions directly to a PROTECTIVE ACTION operation 212.

In optional FALSE POSITIVE check operation 210, a determination is made whether the malicious jump-call-pop shellcode construct detected in operation 206 is a false positive. In one embodiment, the malicious jump-call-pop shellcode construct detected in operation 206 and/or other data characteristic(s) of the stalled data are compared to false positive shellcode signatures maintained in a false positive shellcode signature database. Herein a false positive shellcode signature is any pattern or data characteristic that identifies shellcode or a portion of shellcode in data as not being a malicious jump-call-pop shellcode construct.

Upon a match of a false positive shellcode signature to the malicious jump-call-pop shellcode construct, or other data characteristic(s) of the stalled data, the malicious jump-call-pop shellcode construct is determined to be a false positive ("YES"), i.e., defined as not a malicious jump-call-pop shellcode construct, and processing transitions from FALSE POSITIVE check operation 210 to RELEASE DATA operation 218 earlier described.

Referring again to optional FALSE POSITIVE check operation 210, alternatively, when there is not a match of the malicious jump-call-pop shellcode construct or other data characteristics(s) of the stalled data to a false positive shellcode signature, the malicious jump-call-pop shellcode construct is defined not to be a false positive ("NO"), e.g., remains indicative of a malicious jump-call-pop shellcode construct, and processing transitions from FALSE POSITIVE check operation 210 to a PROTECTIVE ACTION operation 212.

In PROTECTIVE ACTION operation 212, protective action is taken, such as generating an alert to network-based IDS 108 or preventing execution of the malicious jump-call-pop shellcode, for example by deleting or quarantining the data packets containing the malicious jump-call-pop shellcode construct (and any associated malicious code). From PROTECTIVE ACTION operation 212, processing transitions to an optional NOTIFY operation 214, or, if optional NOTIFY operation 214 is not performed, directly to EXIT operation 216 with processing exiting method 200.

In optional NOTIFY operation 214, a notification is provided to a user or other entity, such as a system administrator or analysis center 112, informing of the detection and/or protective action taken. From optional NOTIFY operation 214, processing transitions to EXIT operation 216 with processing exiting method 200.

As earlier described with reference to MALICIOUS JUMP-CALL-POP SHELLCODE CONSTRUCT DETECTED check operation 208, in one embodiment, the stalled data, e.g., data packet, is examined to determine whether a malicious jump-call-pop shellcode construct is detected. In one embodiment, the stalled data are examined to determine whether there is a match to a malicious jump-call-pop shellcode signature further described with reference to FIGS. 3 and 4.

Figure 3:
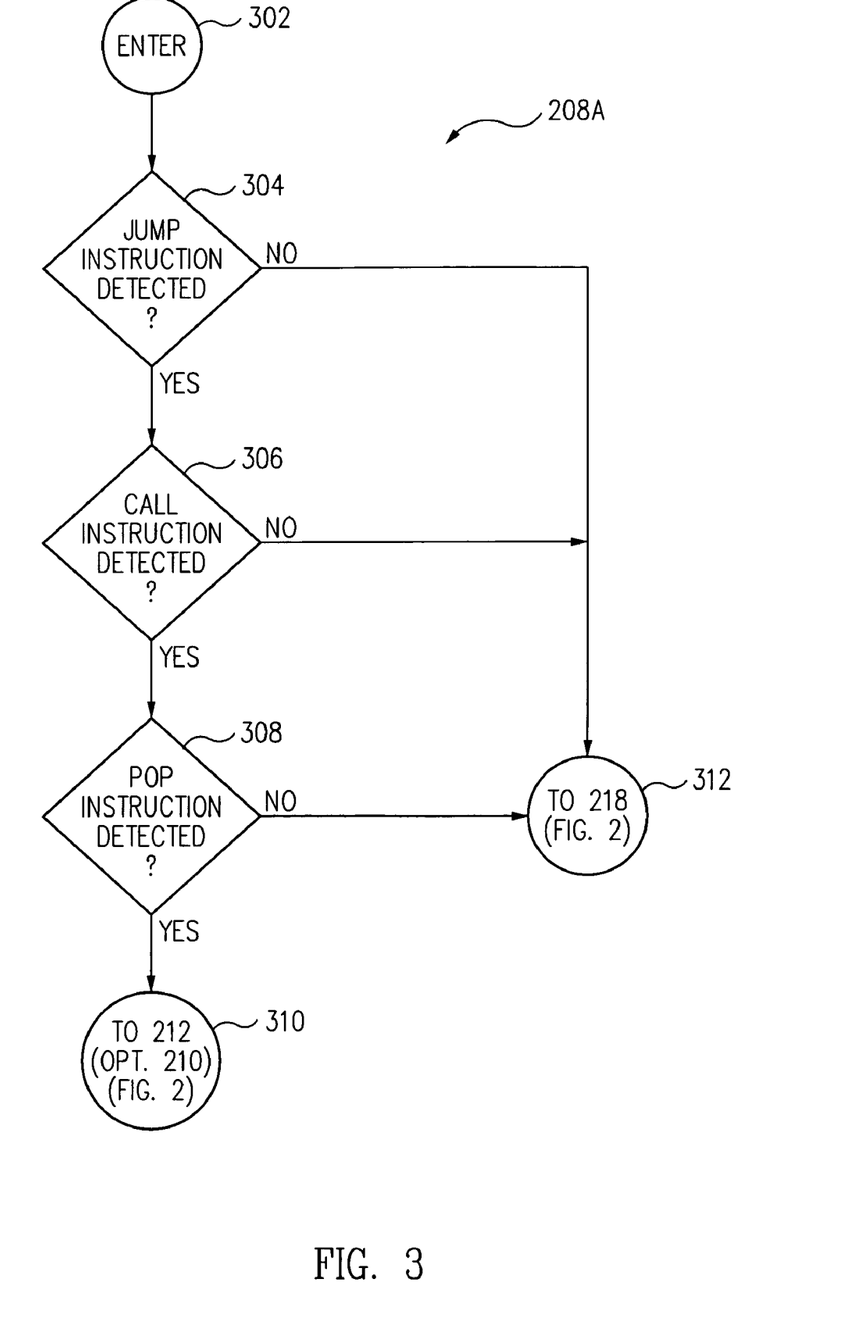
FIG. 3 illustrates a flow diagram of a process for determining whether a malicious jump-call-pop shellcode construct is detected in accordance with one embodiment of the present invention.

FIG. 3 illustrates a flow diagram of a process 208A for determining whether a malicious jump-call-pop shellcode construct is detected in operation 208 in accordance with one embodiment of the present invention. The operations of FIG. 3 are described herein with reference to FIG. 4 that illustrates detection of a malicious jump-call-pop shellcode construct in a data stream 400 in accordance with one embodiment of the invention.

Figure 4:
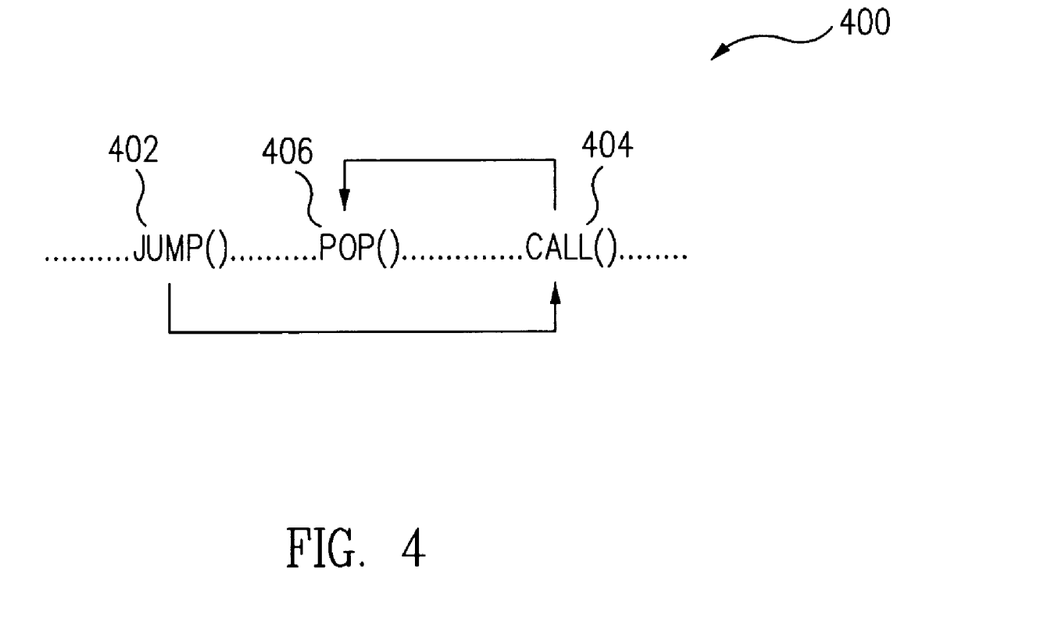
FIG. 4 illustrates detection of a malicious jump-call-pop shellcode construct in a data stream in accordance with one embodiment of the invention.

Referring now to FIGS. 3 and 4 together, in one embodiment, from an ENTER operation 302 processing enters process 208A from STALL DATA operation 206 (FIG. 2) and processing transitions to a JUMP INSTRUCTION DETECTED check operation 304.

In JUMP INSTRUCTION DETECTED check operation 304, data packets are scanned for the presence of a jump instruction. Herein a jump instruction is defined as an instruction in a programming language, such as an assembly language CPU instruction, or a jump instruction label, such as "JMP", or a jump instruction equivalent, such as the IA32 opcode "E9" or "E8", that takes a memory address or offset as a destination argument, and upon execution, transfers program control to a different point in the instruction stream specified by the destination argument, herein termed the jump argument. The jump argument specifies the address or offset of the instruction being jumped to, termed herein the jump location.

When a jump instruction is not detected ("NO"), a malicious jump-call-pop shellcode construct is assumed not to be detected and processing exits process 208A at operation 312 and transitions to RELEASE DATA operation 218 of process 200 (FIG. 2). Otherwise, when a jump instruction is detected ("YES"), for example JUMP( ) 402 in data stream 400, a tentative indication of a malicious jump-call-pop shellcode construct is present, and processing transitions to a CALL INSTRUCTION DETECTED check operation 306.

In CALL INSTRUCTION DETECTED check operation 306, the argument of the jump instruction is used to determine a jump location in the data. The data are scanned at the jump location for the presence of a call instruction, such as the IA32 opcode for a call instruction. Herein a call instruction is defined as an instruction in a programming language, such as an assembly language CPU instruction, or a call instruction label, such as "CALL", or a call instruction equivalent, such as the IA32 opcode for a call instruction, that when executed, branches program control to the instruction (the called instruction) specified by a destination argument, herein termed the call argument. The call argument specifies the address or offset of the called procedure, termed herein the call location.

In some embodiments, the data are scanned a specified number of bytes before and/or after the jump location for the presence of a call instruction. When a call instruction is not detected ("NO"), a malicious jump-call-pop shellcode construct is assumed not to be detected and processing exits process 208A at operation 312 and transitions to RELEASE DATA operation 218 of process 200 (FIG. 2). Otherwise, when a call instruction is detected ("YES"), for example CALL( ) 404 in data stream 400, a stronger indication of a malicious jump-call-pop shellcode construct is present, and processing transitions to a POP DETECTED check operation 308.

In POP INSTRUCTION DETECTED check operation 308, the argument of the call instruction is used to determine a call location in the data. The data are scanned at the call location for the presence of a pop instruction. Herein a pop instruction is defined as an instruction in a programming language, such as an assembly language CPU instruction, or a pop instruction label, such as "POP", or a pop instruction equivalent, such as an IA32 for a pop instruction, that loads the value from the top of the stack, i.e., the program counter value, to the location specified by a destination argument, herein termed the pop argument. The pop argument specifies the location to which the program counter value is loaded, herein termed a target location, such as a register at which the program counter value is accessible by the malicious shellcode.

In some embodiments, the data are scanned a specified number of bytes before and/or after the call location for the presence of a pop instruction. When a pop instruction is not detected ("NO"), a malicious jump-call-pop shellcode construct is assumed not to be detected and processing exits process 208A at operation 312 and transitions to RELEASE DATA operation 218 of process 200 (FIG. 2). Otherwise, when a pop instruction is detected ("YES"), for example POP( ) 406 in data stream 400, a malicious jump-call-pop shellcode construct is indicated, and processing transitions to PROTECTIVE ACTION operation 212, or optionally, to FALSE POSITIVE check operation 210 of process 200 (FIG. 2).

Jump, call, and pop instructions, instruction labels, the opcodes for jump, call, and pop instructions, and the destination arguments of jump, call, and pop instructions are well known to those of skill in the art and are not described in further detail to avoid detracting from the principles of the invention.

Thus, in method 208A, stalled data, such as a data packet, is initially scanned for the presence of a jump instruction. When a jump instruction is detected, the destination argument of the jump instruction, which specifies a jump location, is used to locate a call instruction. When a call instruction is detected at (or near) the jump location, the destination argument of the call instruction, which specifies a call location, is used to locate a pop instruction. When a pop instruction is detected at (or near) the call location, a determination is made that a malicious jump-call-pop shellcode construct is detected.

In some embodiments, the presence of a call instruction is not verified, i.e., detected, at the jump location, but rather the destination argument present at the jump location (whether or not the destination argument is actually associated with a call instruction) is used to determine a call location. When a pop instruction is detected at the call location, i.e., verified, a determination is made that a malicious jump-call-pop shellcode construct is detected.

In other embodiments, other malicious shellcode signatures can be developed for alternative representations of a malicious jump-call-pop shellcode construct. Additionally, other malicious shellcode signatures can be developed for similar malicious shellcode constructs used in attacks under other architectures.

Figure 5:
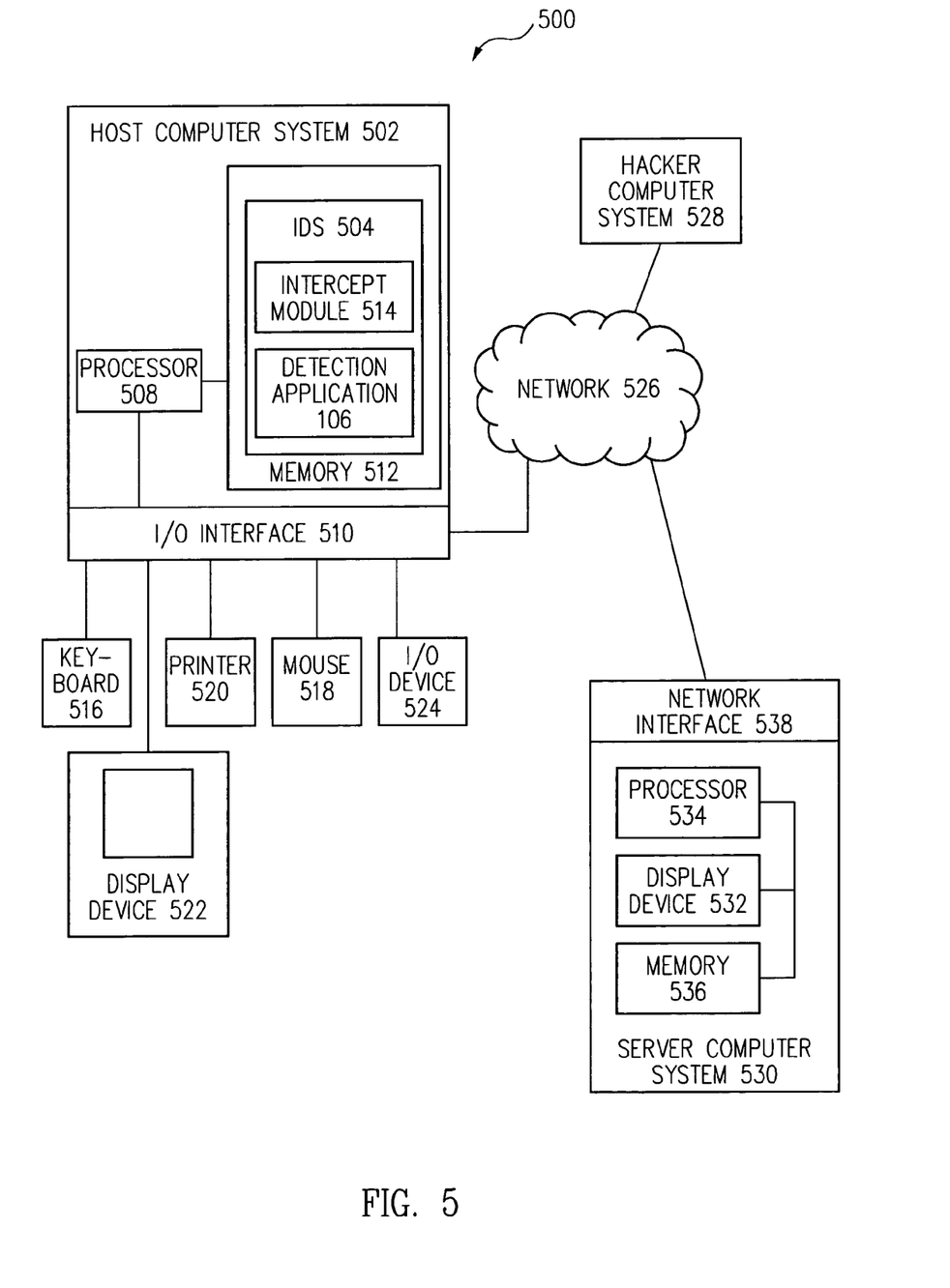
FIG. 5 illustrates a host-based intrusion detection system (IDS) including a detection application for detecting a malicious jump-call-pop shellcode construct in accordance with one embodiment of the present invention.

As earlier described, the present invention can also be implemented on a host-based IDS, rather than as part of a network-based IDS, such as network-based IDS 108. FIG. 5 illustrates a host-based IDS 504 including detection application 106 for detecting a malicious jump-call-pop shellcode construct in accordance with one embodiment of the present invention.

In particular, FIG. 5 illustrates a computer system 500 including a host computer system 502. Host computer system 502 includes a host-based IDS 504 which monitors data streams communicated to host computer system 502, such as a data stream communicated from a hacker computer system 528 over a network 526 to host computer system 502, and/or input by a client to host computer system 502, such as via I/O device 524. In one embodiment, detection application 106 is executing as part of host-based IDS 504.

In the present embodiment, host-based IDS 504 is established on any of a variety of selected communication layers of host computer system 502. For example, in one embodiment, a specified communication layer of host computer system 502 is hooked, e.g., a system call table is hooked, allowing data to be intercepted by host-based IDS 504 and passed to detection application 106. Hooking is well-known to those of skill in the art and not further described herein to avoid detracting from the principles of the invention.

In one embodiment, host-based IDS 504 is established on the network driver layer to collect data packets that are passed to detection application 106. In another embodiment, host-based IDS 504 is established on the system call layer so that data are read from a socket or file and passed to detection application 106 for evaluation before passing the data to an application (if applicable). In yet another embodiment, host-based IDS 504 is established on a library level, in which a library is replaced and data intercepted by host-based IDS 504 and passed to detection application 106. In another embodiment, host-based IDS 504 is built into an application itself so that routines that read data through a common interface from a network or input of the client are passed to detection application 106 for evaluation.

In the present embodiment, host-based IDS 504 includes a module for intercepting data streams communicated to host computer system 502, such as an intercept module 514. Intercept module 514 intercepts data packets in an inbound data stream and passes the data packets to detection application 106 for evaluation.

Host computer system 502 sometimes called a client or user device, typically includes a processor 508, an input/output (I/O) interface 510, and a memory 512. Host computer system 502 may further include standard devices like keyboard 516, a mouse 518, a printer 520, and a display device 522, as well as, one or more standard input/output (I/O) devices 524, such as a compact disk (CD) or DVD drive, floppy disk drive, or other digital or waveform port for inputting data to and outputting data from host computer system 502. In one embodiment, IDS 504 including detection application 106 is loaded into host computer system 502 via I/O device 524, such as from a CD, DVD or floppy disk containing IDS 504 and detection application 106.

In one embodiment, host computer system 502 is further coupled to a server computer system 530 by a network 526. Server computer system 530 typically includes a display device 532, a processor 534, a memory 536, and a network interface 538.

Host computer system 502 is also coupled to hacker computer system 528 by network 526. In one embodiment, hacker computer system 528 is similar to host computer system 502, for example, includes a central processing unit, an input/output (I/O) interface and a memory. Hacker computer system 528 may further includes standard devices like a keyboard, a mouse, a printer, a display device, and an I/O device(s). The various hardware components of hacker computer system 528 are not illustrated to avoid detracting from the principles of the invention.

Network 526 is any network or network system that is of interest to a user. In various embodiments, network interfaces 538 and I/O interface 510 include analog modems, digital modems, or a network interface card.

In the present embodiment, host-based IDS 504 including detection application 106 is stored in memory 512 of host computer system 502 and executed on host computer system 502. As used herein, a computer memory refers to a volatile memory, a non-volatile memory, or a combination of the two.

The particular type and configuration of host computer system 502, server computer system 530, and hacker computer system 528 are not essential to this embodiment of the present invention.

In one embodiment, execution of detection application 106 on host computer system 502 results in the operations of process 200, i.e., operations 202 through 218, (including the operations of process 208A, i.e., operation 302 through 312) as earlier described with reference to FIGS. 2, 3, and 4, with variances made for implementation on host computer system 502 by host-based IDS 504 rather than network-based IDS 108.

Thus, in accordance with the invention, data are received by detection application 106 and a determination is made whether a malicious jump-call-pop shellcode construct used in stack-based buffer overflow attacks on software executing in an IA32 architecture is detected in the data. When a malicious jump-call-pop shellcode construct is detected, protective action is taken, such as preventing execution of the malicious jump-call-pop shellcode. Embodiments in accordance with the invention permit the generic detection of attacks against stack-based buffer overflow vulnerabilities under the IA32 architecture that require the malicious shellcode to determine its (the malicious shellcode's) location in memory, such as by using a malicious jump-call-pop shellcode construct.

Herein, although detection 106 is referred to as an application, this is illustrative only. Detection application 106 should be capable of being called from an application, such as a network-based or host-based IDS or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a network-based IDS and a host-based IDS, an embodiment of the present invention may be carried out using any suitable means and/or hardware configuration involving a personal computer, a workstation, a portable device, or a network of computer devices. Other network configurations including client-server configurations, as well as other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIGS. 1 and 5, this medium may belong to the computer system itself. However, the medium also may be removed from the computer system. For example, referring to FIG. 5, detection application 106 may be stored in memory 536 that is physically located in a location different from processor 508. Processor 508 should be coupled to memory 536. This could be accomplished in a client-server system, or alternatively via a connection to another computer via modems and analog lines, or digital interfaces and a digital carrier line.

More specifically, in one embodiment, host computer system 502 and/or server computer system 530 is a portable computer, a workstation, a two-way pager, a cellular telephone, a digital wireless telephone, a personal digital assistant, a server computer, an Internet appliance, or any other device that includes components that execute the shellcode construct detection functionality in accordance with at least one of the embodiments as described herein. Similarly, in another embodiment, host computer system 502 and/or server computer system 530 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the shellcode construct detection functionality in accordance with the embodiments of present invention can be implemented in a wide variety of computer system configurations. In addition, the shellcode construct detection functionality could be stored as different modules in memories of different devices.

For example, detection application 106 could initially be stored in server computer system 530, and then as necessary, a portion of detection application 106 could be transferred to host computer system 502 and executed on host computer system 502. Consequently, part of the shellcode construct detection functionality would be executed on processor 534 of server computer system 530, and another part would be executed on processor 508 of host computer system 502. In this embodiment, network interface 538 and I/O interface 510 would include analog modems, digital modems, or a network interface card. If modems are used, network 526 includes a communications network, and detection application 106 is downloaded via the communications network.

In view of this disclosure, those of skill in the art can implement various embodiments of the present invention in a wide-variety of physical hardware configurations using an operating system and computer programming language of interest to the user.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
executing, with a processor, a detection application stored in a memory coupled to said processor to generate a method comprising:
receiving data from a data stream on a computer system;
stalling said data on said computer system prior to execution of said data;
determining whether a malicious jump-call-pop shellcode construct is detected in said data, wherein said determining whether a malicious jump-call-pop shellcode construct is detected in said data comprises:
determining whether a jump instruction is detected in said data, said jump instruction having an associated destination argument specifying a jump location;
upon a determination that said jump instruction is detected in said data, determining whether a call instruction is detected in said data at said jump location, said call instruction having an associated destination argument specifying a call location;
upon a determination that said call instruction is detected in said data at said jump location, determining whether a pop instruction is detected in said data at said call location; and
upon a determination that said pop instruction is detected in said data at said call location, determining that said malicious jump-call-pop shellcode construct is detected in said data, and
taking protective action.

2. The method of claim 1, further comprising:
providing a notification.

3. The method of claim 1, wherein said malicious jump-call-pop shellcode construct is used in stack-based buffer overflow attacks against software executing in an IA32 architecture.

4. The method of claim 1, further comprising:
wherein upon a determination that said jump instruction is not detected in said data, determining that said malicious jump-call-pop shellcode construct is not detected in said data, and
releasing said data.

5. The method of claim 1, further comprising:
wherein upon a determination that said call instruction is not detected in said data at said jump location, determining that said malicious jump-call-pop shellcode construct is not detected in said data, and
releasing said data.

6. The method of claim 1, further comprising:
wherein upon a determination that said pop instruction is not detected in said data at said call location, determining that said malicious jump-call-pop shellcode construct is not detected in said data, and
releasing said data.

7. The method of claim 1, wherein said determining whether a call instruction is detected in said data at said jump location comprises scanning said data only at or near said jump location for said call instruction, wherein said call instruction is detected at or near said jump location; and
further wherein said determining whether a pop instruction is detected in said data at said call location comprises scanning said data only at or near said call location for said pop instruction, wherein said pop instruction is detected at or near said call location.

8. The method of claim 1, wherein said jump instruction is an opcode for a jump instruction.

9. The method of claim 1, wherein said call instruction is an opcode for a call instruction.

10. The method of claim 1, wherein said pop instruction is an opcode for a pop instruction.

11. A computer program product comprising a computer-readable storage medium configured to store computer program code comprising:
a detection application for detecting a malicious jump-call-pop shellcode construct, said detection application comprising:
means for receiving data from one or more data streams on a computer system;
means for stalling said data on said computer system prior to execution of said data;
means for determining whether said malicious jump-call-pop shellcode construct is detected in said data, wherein said means for determining whether a malicious jump-call-pop shellcode construct is detected in said data further comprises:
means for detecting a jump instruction, wherein the jump instruction has an associated destination argument specifying a jump location;
means for detecting a call instruction at said jump location upon a determination that said jump instruction is detected, wherein the call instruction has an associated destination argument specifying a call location; and
means for detecting a pop instruction at said call location upon a determination that said call instruction is detected, wherein upon a determination that said pop instruction is detected at said call location, determining that said malicious jump-call-pop shellcode construct is detected;
means for releasing said data upon a determination that said malicious jump-call-pop shellcode construct is not detected in said data; and
means for taking protective action upon a determination that said malicious jump-call-pop shellcode construct is detected in said data.

12. The computer program product of claim 11, further comprising:
means for providing a notification.

13. The computer program product of claim 11, wherein said detection application is a network-based intrusion detection application.

14. The computer program product of claim 11, wherein said detection application is a host-based intrusion detection application.

15. A computer system comprising:
a memory having stored therein a detection application for detecting a malicious jump-call-pop shellcode construct; and
a processor coupled to said memory, wherein execution of said detection application generates a method comprising:
receiving data from a data stream on said computer system;
stalling said data on said computer system prior to execution of said data;
determining whether a malicious jump-call-pop shellcode construct is detected in said data, wherein said determining whether a malicious jump-call-pop shellcode construct is detected in said data comprises:
determining whether a jump instruction is detected in said data, said jump instruction having an associated destination argument specifying a jump location;
upon a determination that said jump instruction is detected in said data, determining whether a call instruction is detected in said data at said jump location, said call instruction having an associated destination argument specifying a call location;

upon a determination that said call instruction is detected in said data at said jump location, determining whether a pop instruction is detected in said data at said call location; and upon a determination that said pop instruction is detected in said data at said call location, determining that said malicious jump-call-pop shellcode construct is detected in said data, and taking protective action.

16. The computer system of claim 15, the method further comprising:

providing a notification.

17. The computer system of claim 15, the method further comprising:

wherein upon a determination that said jump instruction is not detected in said data, determining that said malicious jump-call-pop shellcode construct is not detected in said data, and releasing said data.

18. The computer system of claim 15, the method further comprising:

wherein upon a determination that said call instruction is not detected in said data at said jump location, determining that said malicious jump-call-pop shellcode construct is not detected in said data, and releasing said data.

19. The computer system of claim 15, the method further comprising:

wherein upon a determination that said pop instruction is not detected in said data at said call location, determining that said malicious jump-call-pop shellcode construct is not detected in said data, and releasing said data.

20. The computer system of claim 15, wherein said jump instruction is an opcode for a jump instruction;

wherein said call instruction is an opcode for a call instruction; and further wherein said pop instruction is an opcode for a pop instruction.

* * * * *